United States Patent [19]

Frank

[11] 4,043,783

[45] Aug. 23, 1977

[54] PRESS SHAPING GLASS SHEETS

[75] Inventor: Robert G. Frank, Murrysville, Pa.

[73] Assignee: PPG Industries, Inc., Pittsburgh, Pa.

[21] Appl. No.: 683,351

[22] Filed: May 5, 1976

[51] Int. Cl.² ............................................. C03B 23/02
[52] U.S. Cl. ........................................ 65/106; 65/245;
65/253; 65/273; 65/275
[58] Field of Search .................. 65/106, 245, 253, 273, 65/275

[56] References Cited

U.S. PATENT DOCUMENTS

3,701,644  10/1972  Frank ..................................... 65/106

Primary Examiner—Arthur D. Kellogg
Attorney, Agent, or Firm—Dennis G. Millman; Edward I. Mates

[57] ABSTRACT

Method and apparatus for controlling deviations from desired shape of a glass sheet shaped by roll forming, wherein a critical portion of the shaped glass sheet is either lifted or twisted momentarily during or immediately following the roll forming operation.

15 Claims, 9 Drawing Figures

PRESS SHAPING GLASS SHEETS

BACKGROUND OF THE INVENTION

The present invention relates to shaping glass sheets, and particularly concerns a method and apparatus for shaping a series of glass sheets by the roll forming method. According to the roll forming method, a series of heat-softened glass sheets is conveyed between an upper set and a lower set of forming rolls of complementary shape. When each glass sheet reaches a position between the sets of forming rolls, the latter move relative to one another into a sheet engaging position for sufficient time for the shape of the rolls to be impressed on the glass sheet as the latter passes between the sets of forming rolls. The sets are separated and the shaped glass sheet proceeds to a cooling or quenching station where the glass sheet is cooled to impart either a partial or full temper or an anneal depending on the rate of cooling. When the next heat-softened glass sheet in the series arrives between said sets, the sets are again moved relative to one another to their sheet engaging position. Such continuous sheet movement has resulted in increasing the rate of production of shaped glass sheets.

The need for curved glass sheets has increased tremendously in recent years, particularly with the increase in use of curved glass for windshields, sidelights and rear windows of automobiles. The problem of increasing the rate of production of shaped glass sheets on a mass production line has been recognized and new methods and apparatus that do not necessarily require glass sheets to be stopped at a shaping station have been developed, as is evidenced by U.S. Pat. No. 3,545,951 to Maurice Nedelec and U.S. Pat. No. 3,701,644 to Robert G. Frank. These patents illustrate different embodiments of apparatus for shaping continuously moving glass sheets by the so-called roll forming method.

The Nedelec patented apparatus has capabilities of shaping glass sheets to a limited family of shapes about one axis only to shapes that are of uniform curvature from end to end of the sheets along the path of glass sheet movement through the roll forming apparatus. The Frank patented apparatus is also capable of producing bends about a single axis of bending and in addition can produce compound bends comprising bends about two mutually perpendicular axes or bends whose radii of curvature vary from portion to portion of the bent sheets along the path of sheet movement through the roll forming apparatus. When the Frank patented apparatus has been used to produce simple cylindrical bends about a single axis, from time to time, local deviations in curvature have been discovered. Such deviations from desired curvature are also believed to be inherent in the operation of the Nedelec patented apparatus.

One of the problems associated with roll forming is the development of kinks along one or both longitudinal edges of glass sheets shaped by roll forming apparatus. This is particularly noticeable in the shaping of glass sheets of relatively small dimensions and is termed "edge kinking." Another defect attributed to roll forming that is found in relatively long sheets is excessive sag, particularly in the central portion of the sheet. At times, edge kinking and/or excessive sag was so great that shaped glass sheets fabricated on roll forming apparatus were not acceptable by the customer because of their failure to meet the tolerances established by the customer.

U.S. Pat. No. 3,869,269 to Isaac D. Knapp discloses devices that reduce the deviations from desired shape associated with edge kinking and certain types of excessive sag. The apparatus patented by Knapp makes it possible to reduce the deviations from desired shape by a method which comprises applying additional rolling contact against a portion of one of the surfaces of a newly shaped glass sheet when said portion deviates from the shape desired therefor by at least a predetermined amount before the sheet cools to below its deformation temperature. The additional rolling contact is provided against the upper surface of the glass sheet along its edge in the case edge kinking is present. In case the glass shape produced by roll forming includes too great a sag, the additional rolling contact is applied against the bottom surface only of the glass in its sagged portion to help the glass assume a shape conforming more closely to that desired.

The Knapp invention is designed specifically to produce shaped glass sheets with a minimum of optical defects and free of deviations in shape so great as to be unacceptable in commerce. The apparatus aspect of the Knapp invention involves the incorporation of additional roller means disposed in spaced relation to the conventional forming rolls of roll forming apparatus. Means are provided for supporting said additional roller means in position to engage a portion of the surface of the glass sheet that deviates in the direction of said engaged surface from the shape desired therefor by at least a predetermined amount.

The additional roller means incorporated in the Knapp apparatus is mounted in fixed position. Therefore, it is not flexible in eliminating the problems associated with roll forming as would be desired, particularly, these problems involve excessive sag that is non-uniform along the length of the glass sheets being processed and the shaping of sheets having a pointed end which tend to develop end kinking at the longitudinal extremity of the glass as distinguished from the edge kinking problem solved by the Knapp patent.

SUMMARY OF THE INVENTION

The present invention makes it possible to reduce the deviations from desired shape that result from non-uniform excessive sag that is sometimes developed in excessively long sheets, that is, those in excess of 1 meter in length, and also sagging that develops at a longitudinal extremity or a longitudinal side extremity of certain non-rectangular shapes of glass sheets. In order to solve the problem of minimizing the effects of these deviations from curvature, the present invention incorporates with the roll forming apparatus at least one selected roll. This may be one of the rotating conveyor rolls or one of the lower sets of rotating forming rolls. Means is provided for lifting the preselected rotating roll into contact with the deviating portion of the lower surface of the glass sheet at a sufficient height above the level of the surface generated by the lower set of rotating forming rolls for sufficient time to modify the shape imparted to said deviating portion of said glass sheet by engagement between the upper and lower sets of opposed rotating forming rolls.

In the case of improving excessive sag, the selected rotating roll is one of the conveyor rolls that is provided with a specially shaped segment and means is provided to lift said roll so that the special conveyor roll rises to engage an elongated geographical center portion of the undersurface of the glass sheet to reduce said excessive sag when it is lifted. The means then lowers the selected conveyor roll to disengage the undersurface before the trailing edge of the glass sheet passes thereover. Thus, one aspect of the present invention enables the momentary upward movement of one of the conveyor rolls within the roll forming station to modify the shape of the geographical center portion of the undersurface of the glass sheet without affecting the shape of its leading edge portion or its trailing edge portion.

In another aspect of the present invention wherein the glass sheet has a narrow longitudinal extremity portion, the selected rotating roll is one of the lower forming rolls and is provided with means that permits the rotating forming roll to be lifted or tilted so that it rises to engage the narrow longitudinal extremity portion to increase the curvature of the narrow longitudinal extremity portion when the latter is lifted. If the narrow longitudinal extremity portion is disposed centrally of the transverse dimension of the glass relative to its path of movement through the roll forming station, the preselected rotating forming roll is lifted uniformly from both sides by both of its ends so as to raise the preselected rotating forming roll essentially vertically. A pair of lifting devices is provided in conjunction with the preselected rotating forming roll so that both lifting devices can be actuated simultaneously in order to lift the preselected special rotating forming roll vertically. However, either of the lifting devices can be actuated separately in order to lift a selected end portion of the selected rotating forming roll so as to lift the narrow longitudinal extremity portion of the glass sheet deviated from desired shape when the latter is offset from the longitudinal center line of the sheet to one side or the other. The roll lifting device lifts or tilts the selected forming roll sufficiently to provide the necessary lifting required to correct for said deviation.

In the usual operation of a roll forming apparatus, glass sheets are conveyed into the roll forming station on a series of permanently fixed rotating conveyor rolls between an upper set of forming rolls and a lower set of rotating forming rolls, the upper set being disposed above the rotating conveyor rolls and the lower set being disposed below the rotating conveyor rolls. The lower rotating forming rolls are lifted in unison to sandwich the moving glass between the upper and lower sets above the level occupied by the rotating conveyor rolls. When the glass is shaped, the upper set of rotating forming rolls is retracted slightly and the lower set of rotating forming rolls is retracted to a position below the positions occupied by the rotating conveyor rolls. In the embodiment of this invention in which excessive center sag is corrected, the selected rotating conveyor roll is raised above the general level of the lower forming rolls, after the leading edge of the sheet passes, for a sufficient time to engage the portion of the glass that is subject to excessive center sag and then is lowered before its trailing edge passes so as to insure that only the deviated glass portion is modified in shape.

In case of glass sheets having a narrow longitudinal extremity portion, if the portion is offset from the center, the selected lower forming roll is lifted after the upper set of rolls retracts so that the portion of the glass that forms its narrow longitudinal extremity portion is tilted above the general surface of the shape formed by the rolls supported on the rotating lower set of forming rolls.

In conveying glass sheets into a roll forming station, it is preferred to have the wider portion oriented to be the leading edge portion so that as much of the entire width of the glass sheet as possible is simultaneously engaged between the upper and lower rolls as the lower rolls are raised to lift the glass into roll forming engagement. Thus, for certain window pairs for automobiles having a window opening with a narrow end on one side that is the mirror image of the window opening on the other side, the automobile would require a curved window having a narrow longitudinal extremity portion on one side that is the mirror image of the narrow longitudinal extremity portion for the window for the other side. Therefore, it is necessary that the glass sheets oriented for movement through the roll forming station with its wider edge as the leading edge and its narrow longitudinal extremity portion offset from the longitudinal center line of the glass as its trailing edge portion to have the selected lower forming roll tilted in one direction for one of these patterns and tilted in the opposite direction to handle the mirror image pattern. Such tilting is provided by mounting the roll between a pair of lifting devices, one on each side of said special roll with spherical bearings provided to permit one of the lifting devices to tilt the preselected rotating forming roll in one direction when actuated to lift a narrow longitudinal extremity portion disposed to one side of the sheet and the other lifting device to be actuated when the mirror image pattern of glass sheet is being treated.

These and other elements of the present invention will be understood better in the light of a description of an illustrative embodiment and variations thereof that follows.

BRIEF DESCRIPTION OF THE DRAWINGS

In the drawings which form part of the description of the illustrative embodiment that follows.

BRIEF DESCRIPTION OF THE PREFERRED EMBODIMENT

Figure 1:
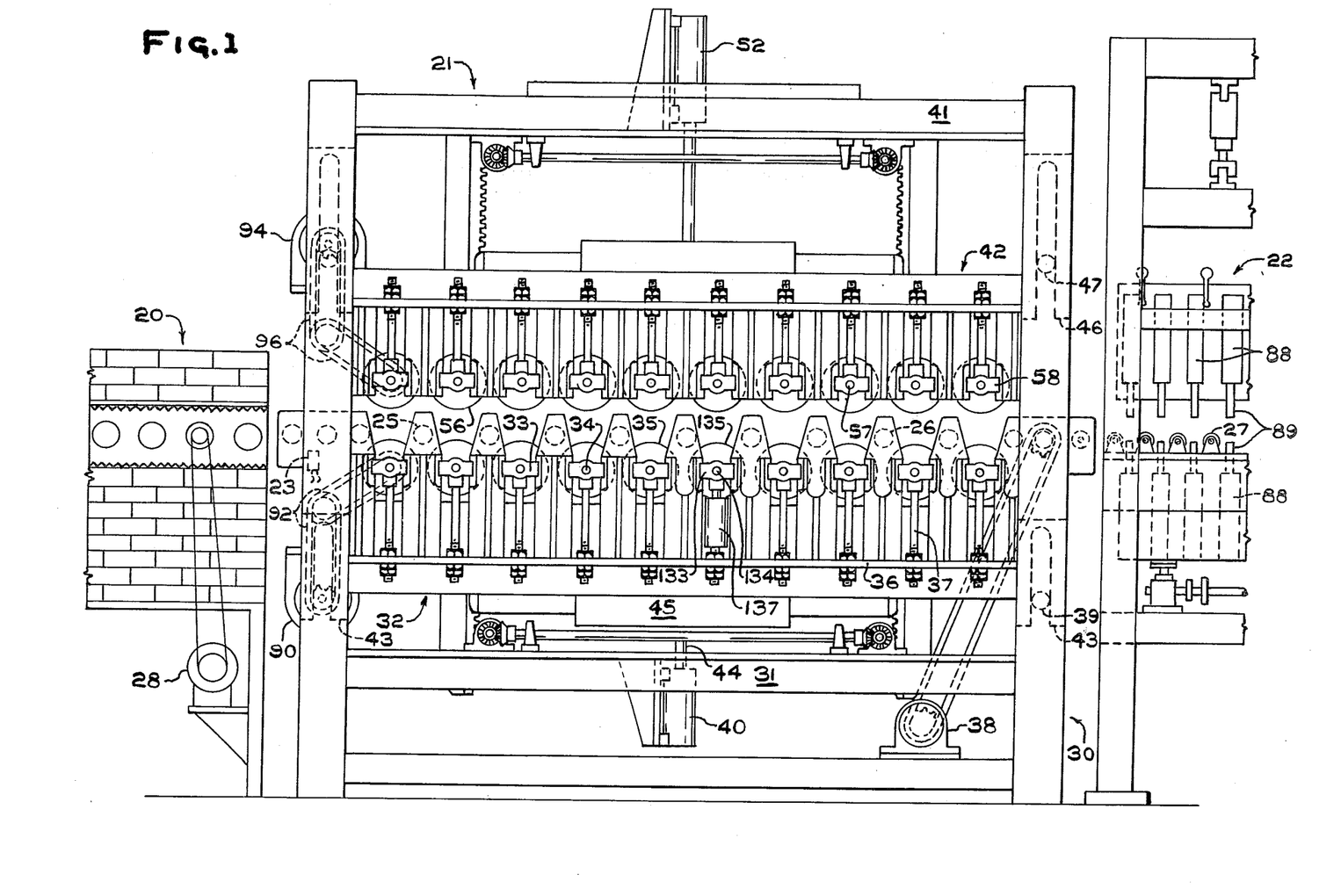
FIG. 1 is a longitudinal elevation of a typical roll forming apparatus modified according to the present invention.

Referring to the drawings, FIG. 1 discloses a side view of a roll forming apparatus of the type depicted in U.S. Pat. No. 3,701,644 to Robert G. Frank modified to incorporate a preferred embodiment of the present invention. The roll forming apparatus of the present invention comprises a tunnel-type heating furnace 20, a sheet forming station 21 of the roll forming type, and a cooling station 22 of the type also depicted in the aforesaid Frank patent.

A glass sensing device 23 of the type well known in the art, such as an ulraviolet or infrared sensing device, is located between the exit of the furnace 20 and the entrance to the sheet forming station 21 to detect the passage of the trailing edge of a glass sheet to actuate operation of the sheet forming station 21 to perform its sheet forming function.

The conveyor system extends through the length of the furnace 20, the sheet forming station 21 and the cooling station 22. The conveyor system comprises a series of longitudinally spaced, horizontally extending conveyor rolls 24 of 1¾ inch diameter disposed at three inch spacing throughout the length of the furnace for conveying a succession of glass sheets G therealong. The conveyor rolls 24 disposed in the furnace are preferably made of stainless steel and are of cylindrical configuration and rigid.

Additional conveyor rolls 25, also of rigid stainless steel shaft construction, each having an outer diameter of 1 inch and spaced on 7 inch centers, are located in the entrance end portion of the sheet forming station 21 and are covered with thin sleeves of fiber glass. Additional conveyor rolls 26 which are flexible to conform to the shape of shaped sheets are located in the exit end portion of the sheet forming station 21 and have the same outer diameters and roll to roll spacing as rigid conveyor rolls 25. The flexible conveyor rolls 26 are described and claimed in U.S. Pat. No. 3,934,996 of Robert G. Frank, and the description of said rolls in said patent is incorporated herein by reference. Additional conveyor rolls 27 of the adjustable mandrel type found suitable for use in the cooling station 22 and which are of the type of conveyor roll that is shown in U.S. Pat. No. 3,807,982 of Claassen and Canonaco or U.S. Pat. No. 3,807,546 of Canonaco are disposed in the cooling station 22, or at least in the entrance portion of the cooling station.

The conveyor rolls 24, 25, 26 and 27 form different sections of the conveyor system. Each conveyor section is driven off a drive motor 28 through a drive chain that interconnects a sprocket on the drive motor shaft with a sprocket on a conveyor roll shaft. A separate longitudinally extending drive shaft 29 (FIGS. 2 and 6) is provided with bevel gears, one to mesh with a bevel gear for each conveyor roll 24, 25, 26 or 27 to drive each conveyor roll of the conveyor section off the longitudinally extending drive shaft 29 for its respective conveyor section. If desired, certain conveyor rolls of one section may be disconnected by clutches from the motor driving one conveyor section for a driving connection to a motor driving another conveyor section, in a manner well known in the art. Also, the conveyor sections may be further subdivided, or the entire conveyor system may be made as one continuous section off a single drive motor and a single longitudinally extending drive shaft provided with bevel gears, as desired.

The furnace 20 comprises a tunnel-type passageway through which flat glass sheets are conveyed with their lower surface supported by successive rigid conveyor rolls 24. The furnace has heating elements, which may be electrical resistance heaters supported by the roof and the floor of the furnace, so that the glass sheets may be irradiated as they are conveyed through the furnace to arrive at the furnace exit at a suitable temperature for shaping by roll forming and tempering.

The sheet forming station 21 of the present invention comprises an open reinforced frame structure 30 comprising a lower platform 31 which supports a vertically movable lower forming roll support housing 32 and a upper platform 41 which supports a vertically movable upper forming roll support housing 42. Both forming roll support housings are oriented in a horizontal plane parallel to the horizontal plane of support provided by the conveyor system. The lower forming roll support housing 32 comprises a pair of sets of vertically adjustable brackets 33. Each of the latter is located in spaced relation at 7 inch spacing along a row intersected by one of two spaced vertical planes that extend longitudinally of the conveyor system to receive one of a series of straight lower common shafts 34 near one or the other of its ends. The brackets 33 of each pair of brackets that support one of the lower common shafts 34 are located in a common vertical plane that extends normal to the first two vertical planes and parallel to the common vertical planes in which other pairs of brackets that support the other straight lower common shafts are located.

The brackets 33 are adjustably positioned in a vertical direction to support the series of common shafts 34 either in alignment with one another either in a horizontal line in a plane parallel to the plane of support provided by the upper tangent common to the horizontal conveyor rolls 24, 25, 26 and 27 of the conveyor system or in an oblique line or in adjustment along a curved line defined by the position of each bracket 33 along each of the two longitudinally extending, spaced, vertical planes or any combination of horizontal, oblique or curved lines as dictated by the nature of the shape to be imparted to the glass sheets being shaped.

Each of the lower common shafts 34 rotatably supports one of a series of lower segmented forming rolls 35. Each segment of the segmented forming rolls 34 is approximately two inches long axially, except for the centermost segments which are approximately 4 inches long. Each central shaping segment is flanked by an equal number of flanking shaping segments on either side thereof.

Figure 2:
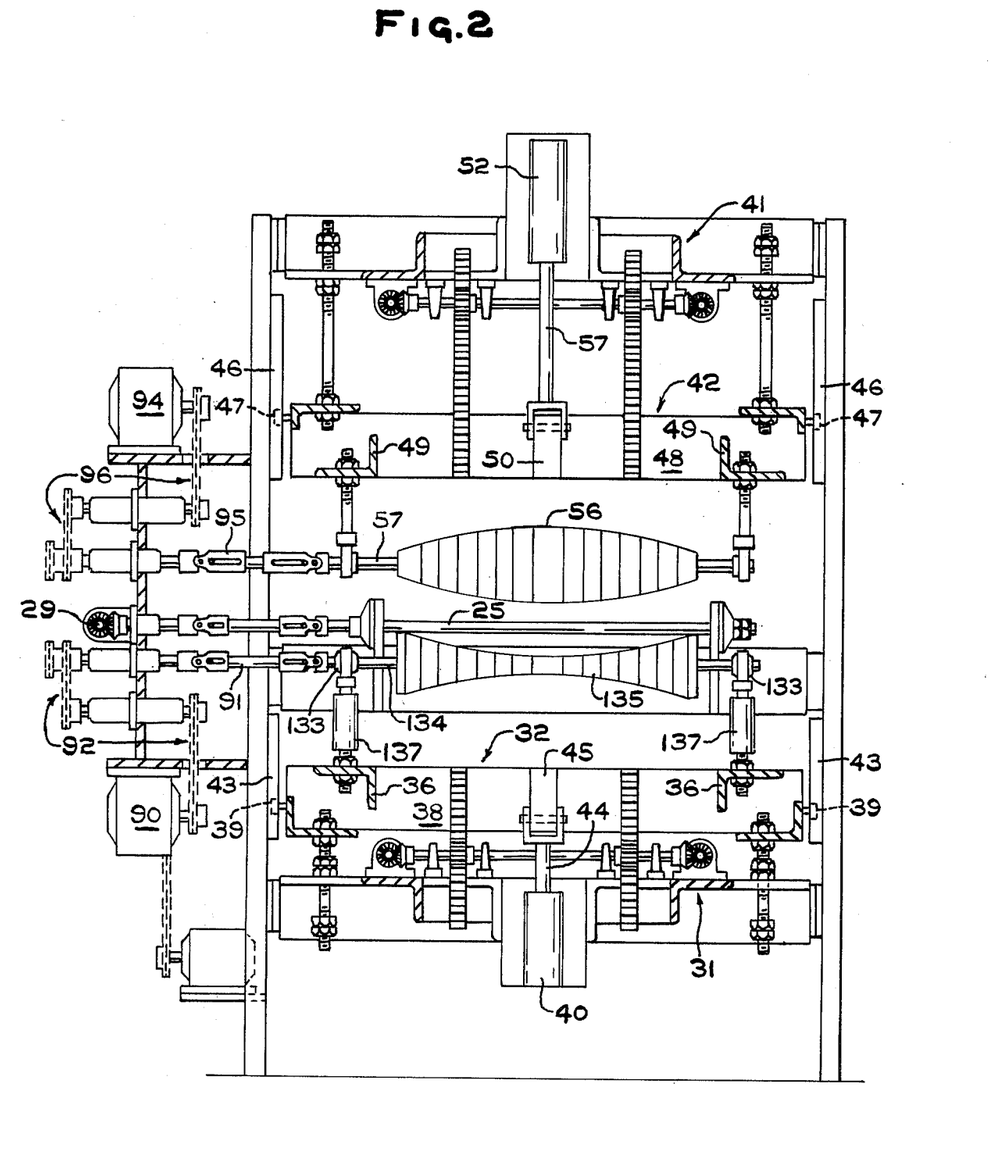
FIG. 2 is a cross sectional view of one embodiment of the present invention showing how one of the lower forming rolls and its support is modified relative to conventional roll forming apparatus for the purpose of the present invention.

An apertured longitudinally extending horizontal angle member 36 is supported along each side of the lower forming roll support housing 32. Each aperture of each horizontal angle member 36 is vertically aligned below an internally threaded vertical opening of a corresponding one of the brackets 33. A series of threaded shafts 37 have their upper ends connected to the brackets 33 and their lower ends extending through a corresponding aperture of one or the other of the horizontal angle members 36. Suitable lock nuts are provided along each shaft 37 above and below a corresponding member 36 to adjust the axial position of the threaded shafts 37 relative to the horizontal angle member 36 so as to fix the position of each bracket 33 relative to the lower roll housing support structure 32. Each horizontal member 36 interconnects a pair of lower end plates 38 (FIG. 2). A roller 39 is attached to each end of each lower end plate 38.

The vertical position of each bracket 33, as determined by adjustment of its associated threaded shaft 37, controls the position of an end portion of a lower common shaft 34. The adjusted position of each pair of brackets 33 of each lower common shaft 34 establishes the orientation of the segmented forming rolls 35 that are mounted on the shafts 34. Each shaft 34 is straight to facilitate mounting and replacement of the segments of a forming roll of desired configuration thereon. It is thus a simple matter to remove one set of forming rolls conforming to one configuration and replace its segments with another set of forming rolls whose segments conform to another configuration whenever parts of a different configuration are to be produced.

The lower forming roll support housing 32 is rigidly attached to a vertically movable rod 44 of a lower piston 40. The latter is supported by the lower platform 31 of the open reinforced frame structure 30. A pair of lower vertical slotted plates 43 is carried by the frame structure 30 for receiving the rollers 39 attached to each end plate 38 of the lower forming roll support housing 32. A structural member 45 is attached to the upper end of the piston rod 44 and interconnects the end plates 38 which are also interconnected by the lower apertured angle members 36. This provides a rigid structure for the lower forming roll support housing 32 so that the set of lower forming rolls 35 supported by said lower forming roll support housing 32 moves in unison in response to actuation by the piston 40.

According to one embodiment of the present invention, a preselected lower segmented forming roll 135 (shaped like the other lower segmented forming rolls 35) is rotatably mounted on a preselected shaft 134 that extends between specially constructed bearing housings 133 that are provided with spherical bearings. Each bearing housing 133 is operatively connected to a lifting device 137 (shown in the form of a piston) so that when only one of the lifting devices 137 is raised, the preselected lower forming roll 135 tilts to enable it to engage a selected longitudinal side portion of a glass sheet moving through the apparatus. Suitable timing circuits (not shown) raise and lower one or both of the lifting devices 137 a controlled distance as desired according to a preset program of raising and lowering so as to have the preselected forming roll 135 engage only a preselected portion of each glass sheet processed, as will be explained later in greater detail.

The open reinforced frame structure 30 also carries two pairs of upper vertically slotted plates 46 that receive upper guide rollers 47 fixed to the ends of upper end plates 48. The latter interconnect the opposite ends of a pair of upper, apertured, longitudinally extending, horizontal angle members 49 that form part of an upper forming roll support housing 42, and that have a reversed structure of those of the horizontal members 36. The upper end plates 48 are connected to an upper structural member 50, which is fixed to the free lower end of a rod 51 of an upper piston 52, which is extendable in a downward direction. A cylinder for the upper piston is supported on the upper platform 41 forming part of the reinforced frame structure 30.

In vertical planes intermediate the vertical planes occupied by the conveyor rolls 25 and 26 in alignment with the vertical planes occupied by the lower set of segmented forming rolls 35, the upper forming roll support housing 42 supports a set of upper segmented forming rolls 56. Each upper segmented forming roll comprises a plurality of shaped segments mounted on a stright upper common shaft 57. The shape of each segment of each upper forming roll 56 is complementary to the shape of the corresponding segment of its corresponding lower forming roll 35 aligned vertically therewith.

The vertical position of each of the upper segmented forming rolls 56 is adjustable in the manner similar to the adjustment provided for the lower segmented forming rolls 35. For example, each upper shaft 57 is received rotatably in one of a series of upper shaft brackets 58, each of which is a reversal of a bracket 33. Externally threaded rods 60 are connected at their lower ends to internally threaded upper sockets of brackets 58 and their upper ends extend through apertures in one or the other of the upper, apertured, longitudinally extending, horizontal angle members 49 and are fixed in position to the latter through pairs of adjustment nuts for each threaded rod, one nut being below the angle member 49 and at least one nut mounted above the angle member 49 to determine the vertical position of each upper bracket 58 that determines the vertical position of each end portion of each upper common shaft 57.

As seen in FIG. 2, the segments of the lower segmented forming rolls 35 and 135 form a substantially continuous concave contour in the axial direction of the straight common shafts 34. This shape conforms to the shape desired about an axis parallel to the path the glass sheet takes through the sheet forming station 21 for an incremental portion of each glass sheet shaped by roll forming. The segments of the upper segmented forming rolls 56 have generally convex outer configurations that are complementary to the configurations of the lower forming roll segments they oppose.

Hence, if all the upper segmented rolls 56 have their shafts 57 in alignment in an upper horizontal plane and the lower segmented rolls 35 have their shafts aligned in a lower horizontal plane, when piston 40 is extended upwardly, the segmented rolls 35 are lifted in unison to positions above the supporting plane occupied by the tangent common to the upper portion of the circumferences of the conveyor rolls 25 and 26 in the sheet forming station. Each vertically aligned pair of rotating upper and lower forming rolls engage different increments of a heat-softened glass sheet moving through a roll forming station when the piston 40 is extended upward a sufficient distance to lift the lower segmented forming rolls 35 into positions of rolling engagement against the undersurface of the glass sheet and forcing the upper surface of the glass sheet into rolling engagement against the upper set of forming rolls 56. Thus, the rotating rolls impose bending forces on different longitudinal increments of the traveling glass sheet simultaneously.

The composition of the roll segments is very important to insure proper operation of the roll forming apparatus with minimum glass breakage or glass marking. The material must have a low thermal conductivity to minimize thermal shock on the hot glass when the latter engages the relatively cold shaping rolls. The rolls must have a low coefficient of thermal expansion over a wide range of temperatures of approximately 600° F. from room temperature to an elevated temperatue that the forming rolls attain on periodically contacting hot glass. They must be of a composition that does not react chemically with glass, that is durable over said wide temperature range, and is readily shaped or machined to complex contours. To meet the aforesaid requirements, the segments of the forming rolls 35 and 56 are composed of an asbestos cement of alumino-silica composition sold by Johns Manville under the trademark of TRANSITE.

In order to assure proper alignment between the upper roll support housing 42 and the lower roll support housing 32 when there is relative movement between the housings 32 and 42 or between each housing and the frame structure 30, each housing is provided with an alignment mechanism. The alignment mechanism is shown in the drawings but not described herein for the sake of brevity since its details are not part of the present invention and may be found in the description contained in U.S. Pat. No. 3,891,420 to Robert G. Frank, which is incorporated in this disclosure by reference.

The lower forming roll support housing 32 and the upper forming roll support housing 42 are provided with stop members to insure that the opposing forming rolls remain separated from one another a minimum distance slightly more than the thickness of the glass sheets being shaped. The stop members are adjusted according to the thickness of glass sheets undergoing roll forming so that the minimum spacing between corresponding shaping rolls in the direction of the glass sheet thickness exceeds the glass sheet thickness by a predetermined amount based on the tolerance permitted by the customer. This is usually between 0.01 inch and 0.05 inch, preferably 0.02 inch to 0.04 inch. Such adjustment reduces the incidence and severity of scuffing of the glass sheets by rolls. This feature of the illustrative embodiment is not part of the present invention and is not described in detail. However, a detail description of this feature is contained in U.S. Pat. No. 3,856,499 to Robert G. Frank, the description of which is incorporated herein by reference.

In order to minimize making of the glass surface due to rubbing by portions of the shaping rolls whose peripheral velocity differs sufficiently from speed of the glass sheet moving through the roll forming apparatus to cause observable rubbing marks, only selected segments of each segmented forming rolls 35 and 135 are keyed to the lower shafts 34 to rotate therewith and the remaining segments of the lower forming rolls are freely rotatable relative to the lower shafts. Likewise, only selected segments of the upper segmented forming rolls 56 are keyed to the upper shafts 57, while the remaining segments are freely rotatable thereon, as described in U.S. Pat. No. 3,701,644 to Robert G. Frank. In addition, low friction devices are disposed between adjacent segments to minimize friction between adjacent segments. These devices are preferably snap rings that may be readily inserted or removed, as described and claimed in U.S. Pat. No. 3,871,855 to Robert G. Frank.

Another feature incorporated in the present apparatus to reduce the severity of marks when they occur in the shaped sheets involves independently adjusting the peripheral speed of the upper driven segments and/or that of the lower driven segments keyed to the respective shafts 57 and 34. To accomplish this end, the lower shafts 34 and 134 are connected to a lower shaft drive motor 90 through lower flexible coupling means 91 and a lower shaft drive system 92, while the upper shafts 57 are connected to an upper shaft drive motor 94 through upper flexible coupling means 95 an an upper shaft drive system 96. Both drive motors 90 and 94 are of the variable speed type. The lower shaft drive motor 90 operates independently of the upper shaft drive motor 94 to rotate the lower shafts 34 in unison at any selected rotational speed that may be the same or different from the rotational speed of the upper shafts 57. Further details of this feature of the illustrative embodiment are contained in U.S. Pat. No. 3,891,420 to Robert G. Frank, the disclosure of which is incorporated herein by reference.

The cooling station 22 may be of any type of glass tempering or heat strengthening apparatus that is well known in the art. One type of cooling station that may be used is disclosed in U.S. Pat. No. 3,245,772 to James H. Cypher and Charles R. Davidson, Jr. Preferably, it comprises upper and lower nozzle boxes 88, each having a set of longitudinally spaced, elongated slot nozzle openings 89 extending transversely of the path defined by the portion of the conveyor that extends through cooling station 22 that includes flexible conveyor rolls 27. The slot openings are preferably about 3/16 inch to ¼ inch wide and about 4 inches apart in each set and the nozzle openings of one set are about 5 inches from the nozzle openings of the other set, and aligned in vertical plane that intersect the spaces between adjacent conveyor rolls 27. The latter have an outer diameter of 3 inches of less at their axial ends and decrease in diameter toward their central portion as needed to conform to the shape of glass sheets being conveyed through the cooling station 22. The exact structure of the cooling station forms no part of the present invention and this description thereof is made as brief as possible because any cooling station used to temper glass sheets on a roller hearth may be used in conjunction with the present invention. Pressurized air from blowers (not shown) is supplied to the upper and lower nozzle boxes 88 for discharge through the nozzle openings 89 to cool bent glass sheets as they are conveyed through the cooling station 22.

If desired, exit doors of the type well in the art may be included to intermittently close the exit slot openings of the furnace 20 and a similar door at the entrance of the cooling station 22 may be included to intermittently close the opening to the cooling station 22. This minimizes the exposure of the sheet forming station 21 to the hot atmosphere of the furnace 20 at one end and to the cold blasts of the cooling station 22 at the other end.

While it is possible to operate the roll forming apparatus to produce relatively simple shapes when only the lower set of segmented forming rolls 35 is moved vertically toward and away from the corresponding upper set of segmented forming rolls 56 to shape the glass sheets, the present invention operates more efficiently when both the upper forming rolls 56 and the lower forming rolls 35 are provided with vertical movement. First of all, when the upper rolls 56 move vertically as well as the lower forming rolls 35, less time is needed for the opposite sets of forming rolls to move their retracted positions to their glass positions. This reduced time provides a greater proportion of the time the roll forming apparatus is running to engage and shape the moving glass sheets. Also, it is particularly important to have the upper set of forming retract upward when roll forming apparatus is modified according to the present invention to provide space for the selected roll that is made vertically movable according to the present invention to lift or twist a localized end portion of a glass sheet that deviates from its desired shape by a lifting or tilting the selected roll without causing any portion of the shaped heat-softened glass sheet to be lifted into reengagement with any of the rotating forming rolls 56 of the upper set.

Figure 3:
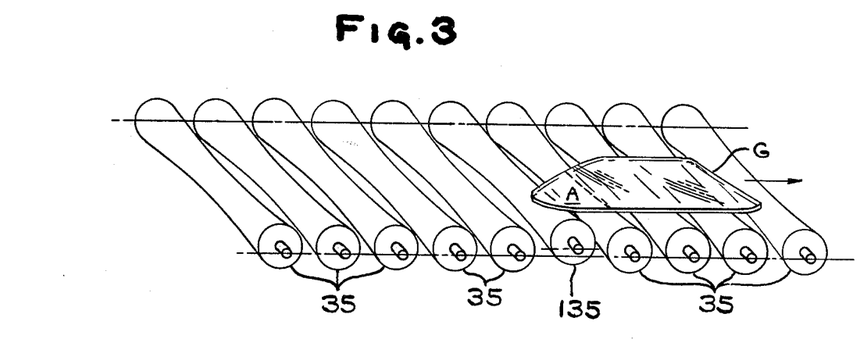
FIG. 3 is a perspective view illustrating how a glass sheet having a narrow longitudinal extremity portion has its portion lifted by one of the preselected lower forming rolls according to the teachings of the present invention.
Figure 4:
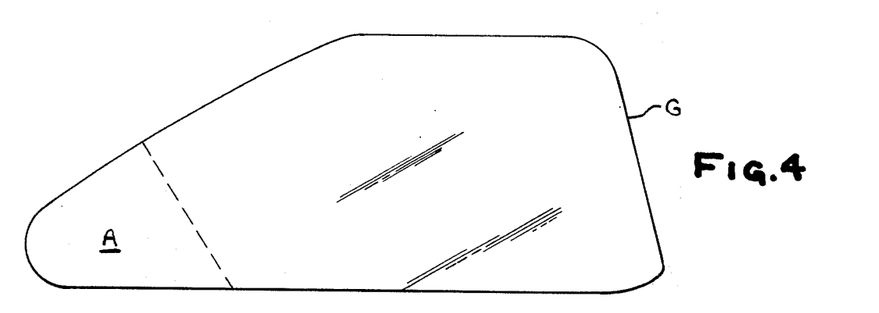
FIG. 4 is a plan view of the glass sheet of FIG. 3 showing the portion that is subjected to additional lifting according to the present invention.

FIGS. 3 and 4 illustrate schematically how a glass sheet G having a relatively wide leading edge and a pointed trailing edge portion A (depicted in FIG. 4) has its portion A engaged by momentarily tilting selected forming roll 135 upward. The lower segmented forming rolls 35 are shown in alignment with one another along a line corresponding to the contour along the length of glass sheet G, whereas the selected segmented lower roll 135 is shown in its temporarily tilted position, which results from lifting the lifting device 137 on the right hand side of FIG. 2. Thus, the preselected lower segmented forming roll 135 is tilted upward for a brief instant sufficient to impart a slight lift to area A whenever the latter area deviates downward from its desired shape.

In order to understand the operation of this embodiment of the invention, a detailed explanation of a typical cycle of a roll forming operation will be described. At the start of a cycle, a glass sheet G is conveyed along conveyor rolls 25 into the sheet forming station with the lower forming rolls 35 and 135 retracted downward below the level common to conveyor rolls 25 and 26 and the upper forming rolls 56 retracted upward as depicted by their respective positions shown in FIG. 2. As the glass sheet G continues into the sheet forming station 21, lower piston 40 raises the lower segmented forming rolls 35 and 135 to lift the glass sheet above the plane of support provided by the conveyor rolls 25 and upper piston 52 lowers the upper segmented forming rolls 56 until the glass sheet has its lower major surface engaging the lower forming rolls 35 and 135 and its upper surface engaging the upper forming rolls 56. At this point of the cycle, each glass sheet portion passing between one of the upper forming rolls 56 and one of the lower forming rolls 35 or 135 is above the plane of support provided by the conveyor rolls 25.

The upper and lower sets of rotating forming rolls remain in simultaneous engagement against the opposite major glass sheet surfaces for sufficient time to shape the glass. Then the upper forming rolls 56 retract part way upward to disengage the upper surface of the shaped glass sheet G while its lower surface is supported on the rotating lower forming rolls 35 and 135. With the upper forming rolls 56 partly retracted and the moving glass sheet rolling over said lower forming rolls toward the cooling station 22, one of the lifting devices 137 is raised to tilt preselected lower forming roll 135 in timed synchronism with the passage of trailing edge portion A thereover to engage the trailing edge portion A of the glass sheet G while almost the entire mass of the glass sheet, including its center of gravity, is supported on the lower forming rolls. Then, all of the lower segmented forming rolls 35 including preselected lower forming roll 135 are retracted and lowered to below the level common to the conveyor rolls 25 and 26, thereby depositing the moving shaped glass sheet onto flexible conveyor rolls 26 after the sheet has been shaped and the shape corrected by the roll forming cycle just described. Before the next glass sheet in the series of glass sheets arrives at the sheet forming station, the lower forming rolls 35 and 135 are lowered to their lower retracted positions and the upper forming rolls 56 are lifted into their fully retracted upper positions preparatory to repeating the roll cycle.

In order for the operation of the present invention to suceed, the programming of the vertical movement of the upper forming rolls 56, the lower forming rolls 35 and the preselected lower forming roll 135 is so arranged that there is sufficient clearance between the upper forming rolls 56 and the glass sheet for the glass sheet G to have its trailing edge portion A only engaged by the preselected lower forming roll 135 when the latter is tilted with a portion thereof disposed above the plane of support provided by the remaining lower forming rolls 35.

It is understood that the opposite lifting device 137 from that actuated may be operated to tilt the preselected lower forming roll 135 in the opposite oblique direction from theat depicted in FIG. 3, when a glass sheet G conveyed through the sheet forming station 21 with its pointed extremity along the opposite longitudinal side edge from that depicted in FIG. 4. Otherwise, the cycle of movements for the various forming rolls is identical to that just described.

It is also understood that if a glass sheet is provided with a pointed extremity that is substantially centrally disposed relative to the width dimension of the glass sheet, both lifting devices 137 may be actuated in unison to provide momontary support for the pointed extremity so as to increase the curvature of the narrow longitudinal extremity portion when it is lifted relative to the remainder of the supported moving glass sheet.

In handling glass sheets having a relatively wide extremity and a relatively narrow extremity, it is important that the glass sheet be oriented to have its wider end oriented as the leading edge of the glass sheet. If the narrow edge is the leading edge, the preselected lower forming roll 135 would have to be lowered rapidly into alignment with the remaining lower forming rolls 35 to support the wider portion of the glass sheet. Such rapid lowering is difficult to attain. Furthermore, it would be necessary to maintain the preselected lower forming roll 135 at a higher elevation than the remaining rolls, and it would be detrimental to the leading edge of the glass to have it collide with a higher roll than the remaining lower forming rolls. On the other hand, raising the preselected lower forming roll 135 to engage and lift the relatively narrow trailing edge portion merely changes the shape of the trailing edge relative to the body glass sheet without involving a collision that is likely to damage a narrow longitudinal extremity portion of the glass sheet.

The momentary lifting or tilting of the preselected lower segmented forming roll 135 to engage and lift the trailing edge portion A is preferably accomplished after substantial completion of the bend and after the upper forming rolls 56 are removed from contract with the upper glass surface. If the shape of the glass sheet is corrected in its leading edge, the correction would have to be done before the entire glass sheet is shaped and would have to involve precise timing of the lifting and rapid lowering of the preselected lower forming roll 135. If the shaped leading edge is corrected after the roll forming apparatus imparts the shape desired to the entire glass sheet, the length of the roll forming apparatus would have to be lengthened, thus requiring each glass sheet to speed more time moving from the furnace to the cooling station. Under such circumstances, it would be necessary to overheat the glass sheets in the furnace so that they arrive at the cooling station at sufficient temperature to insure an adequate temper. The higher glass temperatures needed at the furnace would cause greater distortion in the glass sheet.

Figure 5:
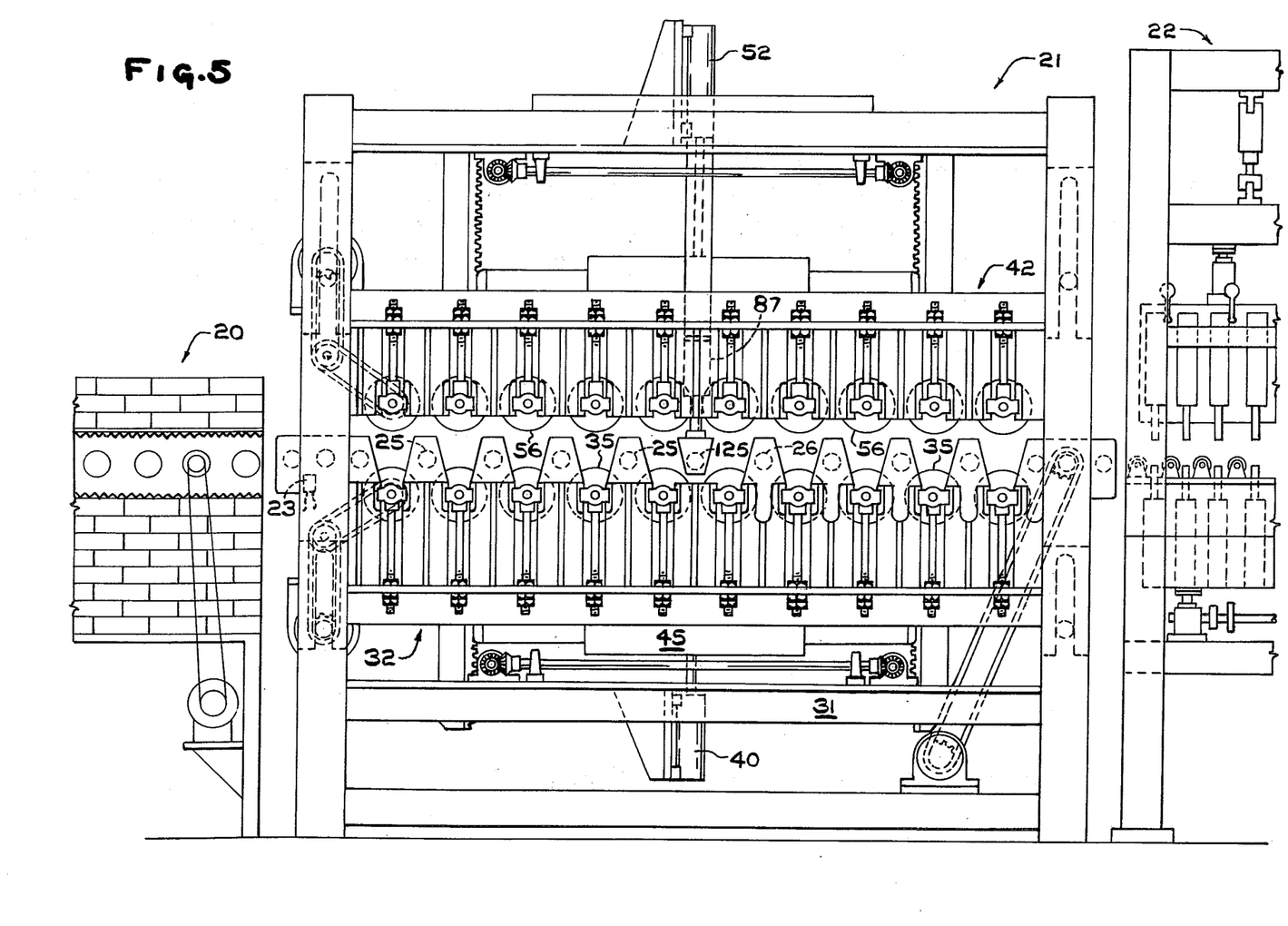
FIG. 5 is a view similar to FIG. 1 of a second embodiment of the present invention.
Figure 6:
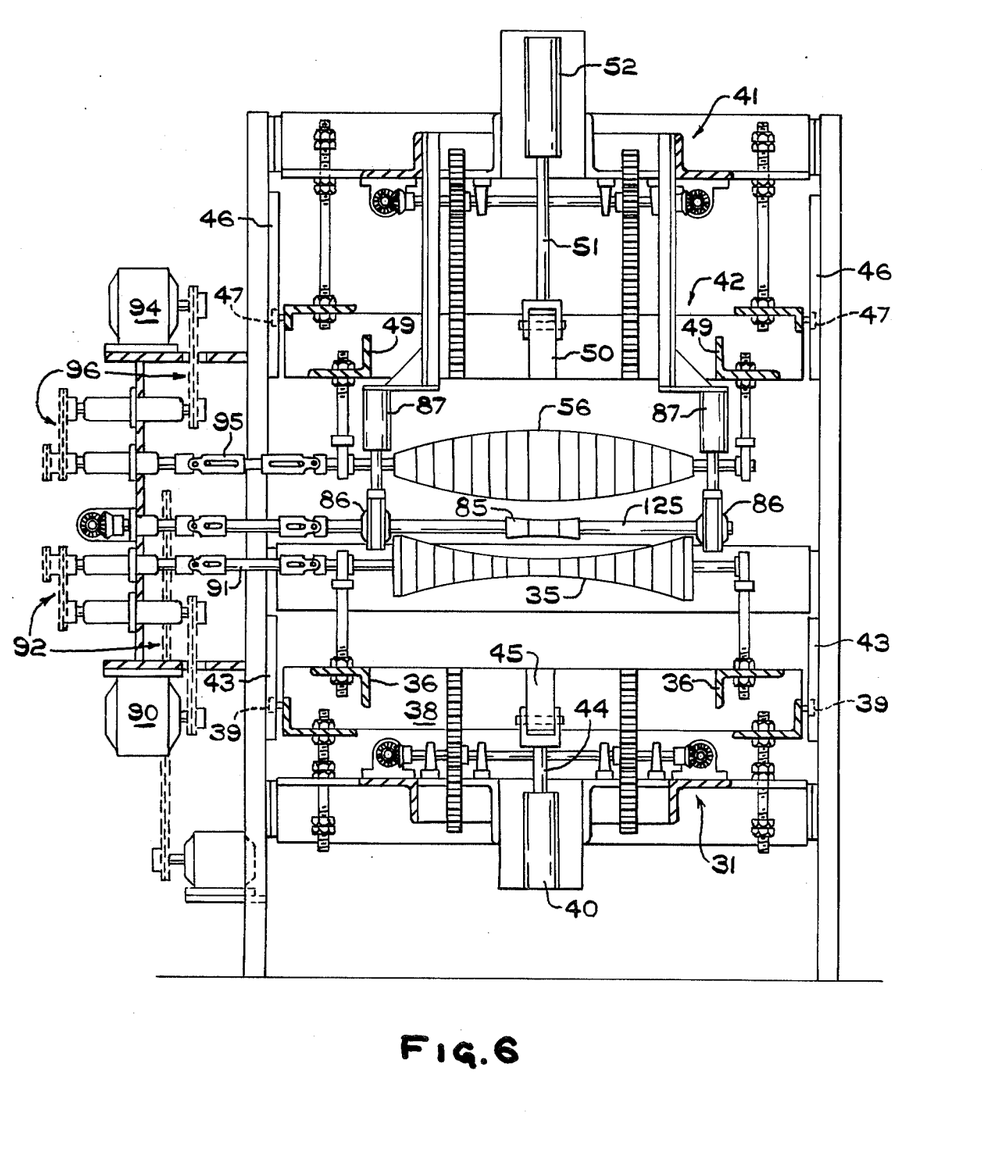
FIG. 6 is a view similar to FIG. 2 of the second embodiment of the present invention.

An alternate embodiment of the present invention to handle excessive center sag is disclosed generally in FIGS. 5 and 6. In this embodiment, a preselected conveyor roll 125 is supported for vertical movement from upper platform 41 by a pair of pistons 87, each of which support a special bracket 86 containing the opposite ends of the preselected conveyor roll 125. Centrally disposed along the special conveyor roll 125 are a plurality of roll segments 85 that have a slightly larger radius of curvature than the radii of curvature of the center segments of the corresponding upper and lower forming rolls 56 and 35, respectively.

This embodiment of the apparatus and its variation depicted in FIG. 9, to be described subsequently, is especially useful in reducing center sag. In roll forming apparatus, when a glass sheet enters the roll forming station, as the lower segmented forming rolls 35 lift the glass off the conveyor rolls 25, the opposite side edges of the glass sheet is lifted on the shaped lower forming rolls 35 and its center sags toward the shape of the lower segmented forming rolls 35. This sag does not completely confrom to the shape of the lower segmented forming rolls 35 as the glass sheet is sandwiched between the lower forming rolls 35 and the upper forming rolls 56, because the opposite forming rolls are kept separated from one another a distance slightly greater than the thickness of the glass sheets undergoing processing so as to minimize surface marking or scuffing of the glass.

This embodiment of the invention will be better understood in the light of the following description of how a roll forming cycle is modified. According to the embodiment of FIGS. 5 and 6, selected conveyor roll 125 is normally supported by the pistons 87 at a level no higher than the remaining conveyor rolls 25 and 26 of the roll forming station 21. Glass sheets entering the forming station are conveyed on rotating conveyor rolls 25 as in the previous embodiment with the rotating forming rolls 56 and 35 retracted fully.

As each glass sheet in succession moves into the sheet forming station 21 with the segments 85 mounted on preselected conveyor roll 125 disposed below the plane of support provided by the conveyor rolls 25, the upper forming rolls 56 move downward from their fully upward retracted positions and the lower forming rolls 35 move upward from their fully retracted lower positions. The rotating lower forming rolls 35 engage the lower surface of the glass sheet to lift the latter above the level of conveyor rolls 25 and 26 into engagement with the rotating upper forming rolls 56. During this engagement sufficient to shape the glass sheet, preselected conveyor roll 125 is then lifted to a position where its segments 85 are raised above the plane of support provided by the remaining conveyor rolls 25 and slightly above the support provided by the lower rotating forming rolls 35 to engage a moving portion of the lower surface of the glass sheet opposite a disengaged moving upper portion intermediate the moving portions engaged by upper rotating forming rolls 56.

Figure 7:
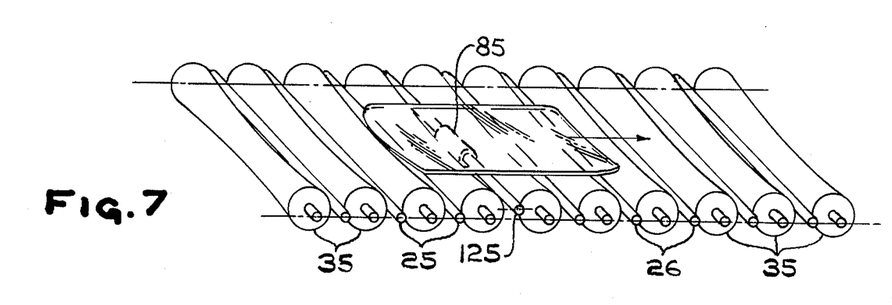
FIG. 7 is a view similar to FIG. 3 showing how a preselected conveyor roll is lifted relative to the remaining conveyor rolls to eliminate excessive sag from a deviated portion in the longitudinal center portion of a glass sheet shaped on a roll forming apparatus.
Figure 8:
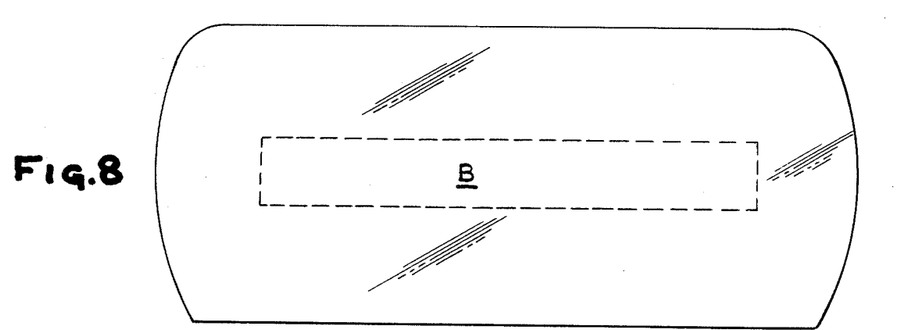
FIG. 8 is a plan view similar to FIG. 4 of a glass sheet showing the area of the glass sheet that is subjected to additional lifting according to the present invention.

The segments 85 remain in slightly raised position relative to the support level provided by the lower rotating forming rolls 35, as long as the segments 85 engage area B (FIG. 8). FIG. 7 shows schematically how selected rotating conveyor roll 125 is supported relative to the level of rotating conveyor rolls 25 and 26 and of lower forming rolls 35 so that its segments 85 support area B above the level of support provided by the remaining conveyor rolls 25 and 26 and lower forming rolls 35.

As the trailing edge of the glass sheet G beyond area B passes beyond the preselected conveyor roll 125, the latter is lowered and the shaped sheet with its excessive sag corrected is conveyed on the rotating flexible conveyor rolls 26 to the cooling station. At this time, the lower forming rolls 35 have been fully retracted and the upper forming rolls 56 have been lifted to their fully upper retracted position to await the arrival of the next glass sheet in the series of sheets to be processed.

It is desirable for both sets of rotating forming rolls to engage spaced portions of the upper and lower glass sheet surfaces on opposite sides of the portions of area B that conveyor roll 125 engages and lifts in the FIG. 8 embodiment. This simultaneous engagement avoids skewing of the glass sheet during roll forming, which skewing may become a problem because this embodiment lifts the moving glass sheet near or at its center or gravity and control of orientation is needed in this case.

Figure 9:
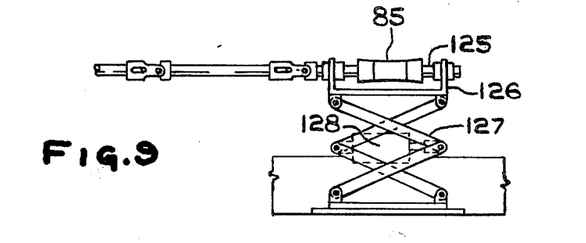
FIG. 9 is a schematic view of an alternate embodiment of the embodiment of FIGS. 5 and 6.

In FIG. 9, an alternate embodiment for raising and lowering the preselected conveyor roll 125 and a modified structure for the latter is depicted. In this alternate embodiment, the segments 85 are mounted on a short roll 125 which is mounted on a bracket 126 supported by a scissor arrangement 127 actuated by a piston 128.

The piston 128 is disposed below the plane of the conveyor and actuates the lifting and lowering of the segments 85 in much the same manner as the pistons 87 of the embodiment of FIGS. 5 and 6. In this embodiment, only one piston is required, lessening the chance of a malfunction due to a failure of the two pistons 87 of the embodiment of FIGS. 5 and 6 to operate in unison.

In both embodiments, the lifting of the segments 85 is programmed to take place after the leading edge portion of the glass sheet passes thereover and the lowering of the segments 85 is programmed to take place before the trailing edge portion of the glass sheet arrives thereover. Hence, these embodiments reduce excessive center sag of the glass sheet without engaging either the leading edge portion or the trailing edge portion thereof.

Timer circuits are normally used in roll forming apparatus to control the vertical movements of the pistons 40 and 52 in response to the sensing of each glass sheet as it passes over the glass sensing device 23. Additional timer circuits of a similar nature actuated by glass sensing device 23 in a similar manner are provided to actuate pistons 137, 87 and/or 128 of the various embodiments of the present invention.

The form of the invention shown and described in this disclosure represents illustrative preferred embodiments thereof. It is understood that various changes may be made, such as tilting a selected conveyor roll or combining tilting and/or lifting one or more selected forming rolls with tilting and/or lifting one or more selected conveyor rolls, without departing from the gist of the invention as defined in the claimed subject matter which follows.

I claim:

1. In the method of shaping glass sheets by the roll forming method wherein a series of hot glass sheets conveyed along rotating conveyor rolls is engaged and lifted above said conveyor rolls while moving between upper and lower sets of opposed rotating forming rolls having complementary shaping surfaces corresponding to the shape desired for each glass sheet in said series for sufficient time to impart a desired shape to each said glass sheet and then said glass sheet is disengaged from said upper set, the improvement comprising lifting at least a portion of a preselected one of said rotating rolls into contact with a preselected portion of the lower surface of said glass sheet at a sufficient height above the level of the surface generated by the lower set of rotating forming rolls while the opposite portion of the upper surface of said glass sheet is disengaged, and continuing said lifting for sufficient time to modify the shape imparted to said preselected portion of said glass sheet by engagement between said upper and lower sets of opposed rotating forming rolls.

2. The improvement as in claim 1, wherein said preselected rotating roll rises after the leading edge of said glass sheet passes thereover to engage an elongated center portion of the under surface of said glass sheet to reduce excessive center sag when it is lifted and then lowers to disengage said under surface before the trailing edge of said glass sheet passes thereover.

3. The improvement as in claim 2, wherein said preselected rotating roll that rises is one of said conveyor rolls.

4. The improvement as in claim 1, wherein said glass sheet has a narrow longitudinal extremity portion and said preselected rotating roll rises to engage the lower surface of said narrow longitudinal extremity portion to increase the curvature of said narrow longitudinal extremity portion when it is lifted.

5. The improvement as in claim 4, wherein each said glass sheet is oriented for movement in such a manner that during said roll forming, said narrow longitudinal extremity portion is its trailing edge portion.

6. The improvement as in claim 1, wherein said glass sheet has a narrow longitudinal extremity portion disposed in laterally offset relation to the longitudinal center line of said sheet and said selected rotating roll is tilted upward so that the portion thereof aligned with said narrow extremity portion rises above the level of the surface generated by the lower set of rotating forming rolls engage said narrow longitudinal extremity portion to increase the curvature of said narrow longitudinal extremity portion.

7. The improvement as in claim 6, wherein said selected rotating roll is one of said lower set of forming rolls.

8. In apparatus for shaping glass sheets by the roll forming method comprising a plurality of rotating conveyor rolls defining a path, upper and lower sets of opposed rotating forming rolls having complementary shaping surfaces corresponding to the shape desired for each glass sheet to be shaped, means for providing relative movement between said upper and lower sets to engage each glass sheet of a series of moving sheets in succession between said upper and lower sets of opposed rotating forming rolls and to separate said sets from one another, said conveyor rolls and said lower set of forming rolls disposed to face the lower surface of said glass sheets conveyed along said path, the improvement comprising means for automatically lifting at least a portion of a selected one of said so disposed rolls in response to preset timing means into a position slightly above the level of the surface generated by the lower set of opposed rotating forming rolls for sufficient time for said selected roll to contact a desired portion of the lower surface of said glass sheet for sufficient time to change the shape of said desired portion and for subsequently automatically lowering said selected roll to a position not higher than said level of said generated surface when said desired portion of said lower surface of said glass sheet passes over said selected roll.

9. The improvement as in claim 8, wherein said selected roll is a preselected one of said lower rotating forming rolls.

10. The improvement according to claim 8, wherein said selected roll is one of said conveyor rolls.

11. The improvement according to claim 10, wherein means is provided to lift the upper set of forming rolls before said selected roll is lifted.

12. The improvement according to claim 10, wherein said lifting device comprises a piston actuated to lift one end of said selected roll and a spherical bearing beyond the other end of said selected roll to permit angular displacement of said selected roll.

13. The improvement according to claim 10, wherein said lifting device comprises piston means and a spherical bearing operatively connected beyond each end of said selected roll to permit angular displacement of said selected roll about the spherical bearing beyond one end of said selected roll when the piston means beyond the other end is actuated and to permit angular displacement of said selected roll about the other of said spherical bearings when the piston opposite said other spherical bearing is actuated, and permitting vertical displacement when both said piston and spherical bearings are actuated simultaneously.

14. The improvement according to claim 8, wherein said means for raising said selected roll comprises a shaft on which said selected roll is mounted, means to support both ends of said shaft, scissors-type means for raising and lowering said shaft support means and means to actuate the raising and lowering of said scissors support means thereby raising and lowering said selected roll.

15. The improvement as in claim 14, wherein said selected roll is disposed in the laterally central portion of said roll forming apparatus and has a radius of curvature larger than the radius of curvature of said upper and lower sets of opposed rotating forming rolls of said roll forming apparatus.

* * * * *